United States Patent
Jarovitzky

[15] 3,683,046
[45] Aug. 8, 1972

[54] POLYMERIZATION OF 2-PYRROLIDONE WITH CARBON DIOXIDE AS ACTIVATOR AND PARTICULATE MATERIAL FOR REPRODUCIBLE RESULTS

[72] Inventor: Peter A. Jarovitzky, Stamford, Conn.

[73] Assignee: Radiation Research Corporation, Stamford, Conn.

[22] Filed: Sept. 3, 1970

[21] Appl. No.: 69,496

[52] U.S. Cl. ...... 260/857 TW, 260/33.4 R, 260/37 N, 260/78 P
[51] Int. Cl. .......................... C08g 20/16, C08g 41/04
[58] Field of Search ...260/78 P, 78 L, 37 N, 857 TW

[56] References Cited

UNITED STATES PATENTS

| | | |
|---|---|---|
| 3,216,976 | 11/1965 | Schwartz et al..........260/37 N |
| 3,322,715 | 5/1967 | Kumnick .................260/37 N |
| 3,391,125 | 7/1968 | Van Mourik et al.....260/78 L |
| 3,455,885 | 7/1969 | Oka et al..................260/78 L |
| 3,386,943 | 6/1968 | Hedrick et al. ..........260/37 N |
| 3,418,268 | 12/1968 | Hedrick et al. ..........260/37 N |
| 3,419,517 | 12/1968 | Hedrick et al. ..........260/37 N |

*Primary Examiner*—Harold D. Anderson
*Attorney*—Jacobs & Jacobs

[57] ABSTRACT

2-Pyrrolidone is polymerized to a high molecular weight polymer in the presence of an alkaline polymerization catalyst, $CO_2$, and a particulate material that was added to the reaction mass.

5 Claims, No Drawings

POLYMERIZATION OF 2-PYRROLIDONE WITH CARBON DIOXIDE AS ACTIVATOR AND PARTICULATE MATERIAL FOR REPRODUCIBLE RESULTS

This invention relates to the polymerization of 2-pyrrolidone.

Methods for the polymerization of 2-pyrrolidone to form polypyrrolidone have been previously disclosed, for example, in U.S. Pat. Nos. 2,638,463, 2,809,958 and 2,891,038. In general, these methods involve the polymerization of 2-pyrrolidone in the presence of an alkaline polymerization catalyst, and, usually, with an activator as well.

The polymer formed from 2-pyrrolidone is believed to be a linear polyamide, which has come to be known as nylon-4, having the structure:

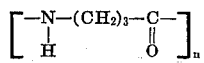

The polymer may be shaped into ribbons, films, molded articles and fibers. Because of its hydrophilic properties, which closely resemble those of cotton and silk, nylon-4 fiber has long been recognized as having great commercial potential. For example, fabrics made from nylon-4, in contrast with other presently available synthetic fibers, are as readily dyed as cotton; they may be ironed at cotton temperatures; they rapidly dissipate static charges; and, in particular, they possess the comfort of cotton and wool.

Nylon-4 fiber has never been made commercially, however, primarily because efforts to manufacture the fiber by the economical melt spinning method have met with almost universal failure. In the copending application of Carl E. Barnes, Ser. No. 763,898, filed Sept. 30, 1968, entitled "Polymers of 2-Pyrrolidone," now abandoned, and in the continuation-in-part application thereof, Ser. No. 69,471, filed Sept. 3, 1970, there is disclosed and claimed novel polymers of 2-pyrrolidone that can be converted into useful shaped articles such as fibers, filaments, rods, bristles, films, ribbons and the like, by the inexpensive method of melt extrusion.

The polymers of 2-pyrrolidone of the aforesaid Barnes applications exhibit a marked increase in heat stability as compared to prior art polymers, which is particularly important in the formation of fibers by melt extrusion.

The aforesaid Barnes applications disclose that the new nylon-4 polymers can be prepared by polymerizing 2-pyrrolidone using an alkaline polymerization catalyst in the presence of $CO_2$. For example, polymerization can be effected by bubbling $CO_2$ through a mixture of 2-pyrrolidone and an alkali metal salt of 2-pyrrolidone, e.g. sodium or potassium pyrrolidonate, the alkali metal pyrrolidonate functioning as an alkaline polymerization catalyst, and then polymerizing the carbonated mixture.

The new polymer of the Barnes applications can also be prepared by reacting $CO_2$ with the alkali metal salt of 2-pyrrolidone to form an adduct of $CO_2$ and the alkali metal pyrrolidonate, and then polymerizing the 2-pyrrolidone monomer in the presence of the adduct.

The specific details of the formation of the new nylon-4 using $CO_2$ can be found in the aforementioned Barnes applications, and therefore the polymerization procedure will only be briefly discussed herein. The reaction conditions for the polymerization of 2-pyrrolidone in the presence of $CO_2$ are essentially the same as that already described in the prior art. In general, 2-pyrrolidone monomer may be polymerized at a temperature from about 18° C. to about 100° C., preferably 25° to 70° C., and most preferably 25° to 60° C., under a pressure ranging from subatmospheric to superatmospheric in the presence of the alkaline polymerization catalyst. Bulk polymerization or suspension polymerization can be used. A technique using an anhydrous nonsolvent, such as hydrocarbon, is suitable, as described in U.S. Pat. No. 2,739,959.

The catalyst may be any alkaline catalyst for polymerizing 2-pyrrolidone, such as those disclosed in previously mentioned U.S. Pat. No. 2,638,463, except that the alkali metals or any other agent that may reduce the sensitive 2-pyrrolidone ring thereby introducing impurities which may be harmful to the polymerization reaction are not used. Suitable catalysts are derivatives of the alkali metals, e.g. the hydrides, hydroxides and oxides of the alkali metals. The alcoholates of the alkali metals, such as sodium methylate, or a quaternary ammonium base as described in U.S. Pat. No. 2,973,343 of the formula:

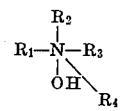

wherein $R_1$, $R_2$ and $R_3$ are lower alkyl radicals and $R_4$ is an alkyl, aryl or aralkyl radical, may be used with good results. The aforesaid Barnes applications provide a complete description of the large number of alkaline polymerization catalysts that can be used.

The catalyst may be used in an amount of 0.5 to 50 percent by weight, based on the 2-pyrrolidone monomer, preferably 5 to 30 wt. percent, most preferably 8 to 20 wt. percent.

The preferred proportion of $CO_2$ and polymerization catalyst is about 2 mols of the catalyst per mol of $CO_2$. The temperature at which the $CO_2$ is added to the catalyst may be varied widely, good results having been obtained at temperatures ranging from 18° C. (approximately the freezing point of the solution of the catalyst in monomer) to 130° C. or higher.

Suitably, the 2-pyrrolidone monomer will be contacted with 0.01 to 10 wt. percent of $CO_2$, based on the weight of the 2-pyrrolidone monomer. Presently preferred amounts are 0.2 to 6 wt. percent, based on the weight of the 2-pyrrolidone, while 0.5 to 5 wt. percent are the most preferred amounts.

The amount of carbon dioxide can also be expressed as a mol percent of the mols of alkaline polymerization catalyst. The amount of carbon dioxide would thus be from about 0.06 to 60 mol percent, based on the mols of the alkaline polymerization catalyst, but higher amounts, e.g. up to about 80 mol percent $CO_2$ based on the mols of alkaline polymerization catalyst have been used. Generally, the amount of $CO_2$ on a molar basis will be from 10 to 80 mol percent, based on the mols of alkaline polymerization catalyst.

It is possible to introduce $CO_2$ into the system other than by bubbling $CO_2$ into the mixture of 2-pyrrolidone and alkaline polymerization catalyst. For example, the source of $CO_2$ can be a compound that will transfer $CO_2$ to the mixture of 2-pyrrolidone monomer and alkaline polymerization catalyst, provided that the anion remaining after loss of $CO_2$ from the compound is not deleterious to the polymerization. Adducts of carbon dioxide and an alkali metal or quaternary ammonium pyrrolidonate can be added to a mixture of 2-pyrrolidone monomer and alkaline polymerization catalyst, as can adducts of $CO_2$ and an alkali metal or quaternary ammonium caprolactamate, with or without any $CO_2$ gas added to the system. These adducts are added to the system on the same weight basis as the $CO_2$.

A convenient method for preparing the adducts is to bubble $CO_2$ through an anhydrous mixture of the pyrrolidonate and 2-pyrrolidone under vacuum until there is a sharp rise in pressure indicating that the $CO_2$ is no longer being readily absorbed. The adduct is precipitated by adding benzene or other organic precipitant to the solution. There is recovered from the precipitate a free-flowing, non-hygroscopic, white powder. Alternatively, the organic precipitant can be added to an anhydrous solution of pyrrolidonate in 2-pyrrolidone before the $CO_2$ is bubbled through the solution, in which case the precipitate forms as the $CO_2$ is absorbed.

Since it is necessary to react $CO_2$ with anhydrous pyrrolidonate, it is preferred to form the $CO_2$-pyrrolidonate adduct by adding $CO_2$ to an anhydrous solution of pyrrolidonate in 2-pyrrolidone, where the pyrrolidonate is formed in situ as described above.

In a similar manner, the adduct of $CO_2$ and caprolactamate is formed by bubbling $CO_2$ through an anhydrous solution of caprolactamate in caprolactam and adding the organic precipitant before or after the $CO_2$ addition. Generally, when the caprolactamate is formed in situ, temperatures in excess of 90° C. are avoided.

While it is preferred to utilize the polymerization catalyst with carbon dioxide as the sole polymerization activator, other polymerization activators may be used in conjunction with carbon dioxide, such as the acyl compounds discussed in previously mentioned U.S. Pat. No. 2,809,958, or any of the activators mentioned in U.S. Patents Nos. 2,912,415; 3,016,366; 3,022,274; 3,028,369; 3,033,831; 3,040,004; 3,042,659; 3,060,153; 3,061,593; 3,069,392; 3,135,719; 3,148,174; 3,158,589; 3,174,951; 3,180,855; and 3,210,324.

When it is desired to use one of these activators along with $CO_2$, acetyl pyrrolidone, adipyl dipyrrolidone or phenylisocyanate are preferred. When employed, the activator may be used in an amount of 0.001 to 25 percent by weight, based on the 2-pyrrolidone monomer, preferably 0.01 to 5 wt. percent, most preferably 0.1 to 3 wt. percent.

Regardless of the method used for polymerization, it is important to carry out the polymerization in the substantial absence of water, although anhydrous conditions are not essential; e.g. the amount of water should not exceed about 0.1 percent by weight of the 2-pyrrolidone monomer.

While the polymerization of 2-pyrrolidone in the presence of $CO_2$ proceeds smoothly, there occurs on occasion the problem of reproducibility of results. In some cases polymerizations that are identically carried out lead to polymers that differ markedly in viscosity.

It has now been found that carrying out the polymerization in the presence of a particulate material tends to result in more reproducible results and often in faster polymerization rates and higher molecular weight polymers. In general, the present invention contemplates polymerizing 2-pyrrolidone in the presence of an alkaline polymerization catalyst, $CO_2$ and a particulate material that has been added to the polymerizate. In the practice of this invention, the particulate material is added to the polymerizate, rather than being formed in situ.

Any particulate material can be used, but best results have been obtained with a mixture of an alkali metal bicarbonate and an alkali metal carbonate, such as sodium and potassium bicarbonate and carbonate, and with carbon black. Good results have also been obtained by using as the particulate material the reaction mass formed from a previous polymerization of 2-pyrrolidone in the presence of $CO_2$, the degree of polymerization not being critical and ranging from about 1 percent conversion of monomer to polymer up to about 50 percent or more. Other particulate materials are alkali metal or alkaline earth metal carbonates, alkaline earth metal oxides, alumina, titanium and silicon dioxide, boron oxides, and the like. In a preferred manner of operation the carbon dioxide is added to a mixture of 2-pyrrolidone, alkaline polymerization catalyst, and particulate material.

Best results are obtained with an amount of particulate material of about 1 to about 3.5 percent, preferably 1.5–2.6, but amounts greater or less than this can be used, such as from about 0.3 to as much as about 10 per cent or higher, all percentages being based on the total weight of 2-pyrrolidone monomer. In general, the desirable effects of the particulate material tend to increase with increasing amounts thereof to a maximum and then to fall off. Very high loadings of particulate material are also not preferred because the reaction mass may become too thick to stir and/or pump with ease.

Good results have been obtained with a particle size of the particulate material in the range of about 0.010 to about 0.50 millimeters, but particle sizes in the range of about 0.005 mm to about 2 mm can be used.

When a mixture of bicarbonate and carbonate is used, it has been found that the weight ratio of bicarbonate to carbonate is desirably from about 1.6:1 to about 6:1, preferably about 3:1, and that the total weight of the mixture is desirably from about 1.2 percent to about 3.5 percent by weight, based on the weight of the 2-pyrrolidone, preferably about 1.5 percent to about 2.6 percent. A particularly preferred recipe is:

|  | Parts by weight |
|---|---|
| 2-Pyrrolidone | 264 |
| KOH (85% assay) * | 20.4 |
| $KHCO_3$ ** | 4.3 |
| $K_2CO_3$ ** | 1.2 |

* KOH pellets assay 85% KOH, 2% $K_2CO_3$ and 13% $H_2O$
** Reagent grade $KHCO_3$ and $K_2CO_3$ The polymerization is preferably effected by heating the 2-pyrrolidone, alkaline polymerization catalyst and particulate material under vacuum to 115° C. or below for 30 minutes while removing water but without distilling off any of the monomer. The reaction mass is cooled to room temperature while maintaining the vacuum and dry $CO_2$ gas is bubbled through the mass until the pressure sharply increases, indicating that $CO_2$ is no longer being absorbed. The polymerizate is transferred to a polymerization oven maintained at 50° C., and polymerization proceeds without any further steps.

EXAMPLE 1

To illustrate the effect of the particulate material, two experiments were conducted, one with and one without particulate material.

In Run 1 264 grams of 2-pyrrolidone and 20.4 grams of 85 percent assay KOH pellets were charged to a 500 ml round bottom flask equipped for vacuum distillation. The contents of the flask were heated under nitrogen to a temperature of about 115° C. at a vacuum of about 3–5 mm Hg for 30 minutes so as to remove the water formed without distilling monomer. The reaction mass was cooled to room temperature and dry $CO_2$ gas was admitted to the flask while the vacuum was maintained. The $CO_2$ addition was stopped when the pressure in the flask reached atmospheric, and the contents of the flask were polymerized at 50° C.

In Run 2, the same procedure was followed except that the charge to the flask was 264 grams 2-pyrrolidone, 20.4 grams KOH pellets (85 percent assay), 4.6 grams reagent grade $KHCO_3$ and 2.7 grams reagent grade $K_2CO_3$.

The results of Runs 1 and 2 are reported in Table I:

TABLE I

Polymerization Results

| | Run 1 | | | Run 2 | |
|---|---|---|---|---|---|
| Time (Hrs) | Conversion (%) | Inherent Viscosity* (dl/g) | Time (Hrs) | Conversion (%) | Inherent Viscosity* (dl/g) |
| 3 | 4 | 3.6 | 5 | 18 | 4.4 |
| 15 | 15 | 4.2 | 18 | 42 | 5.0 |
| 24 | 22.6 | 4.2 | 24 | 51 | 5.5 |
| 60 | 71 | — | 40 | 63 | 5.5 |
| | | | 60 | 73 | 4.8 |

* determined as 0.5 g/dl solution in anhydrous hexafluoroisopropanol at 30°C

These data show that the addition of a particulate material in Run 2 resulted in a faster polymerization. The initial polymerization rate for Run 1 was 1.0 percent per hour while that of Run 2 was 3.0 percent per hour. In a continuous polymerization process this increase of initial rate means that more material can be polymerized per unit time and/or per unit of volume of the equipment.

EXAMPLE 2

Following the procedure of Example 1, several runs were made with two different sources of 2-pyrrolidone at different weight ratios of $KHCO_3$ to $K_2CO_3$. For both monomers, the maximum initial polymerization rate was obtained at a weight ratio of $KHCO_3$ to $K_2CO_3$ of 3.5:1. The results are tabulated below in Table II.

TABLE II

Source of 2-Pyrrolidone

| A | | B | |
|---|---|---|---|
| Weight ratio $KHCO_3$-$K_2CO_3$ | Initial polymerization rate (%/hr) | Weight ratio $KHCO_3$-$K_2CO_3$ | Initial polymerization rate (%/hr) |
| 1.0 | 0.25 | 2.75 | 1.25 |
| 2.0 | 1.5 | 3.0 | 1.9 |
| 3.0 | 2.4 | 3.5 | 2.1 |
| 3.5 | 2.7 | 4.0 | 1.85 |
| 4.0 | 2.6 | 5.0 | 0.75 |
| 5.0 | 2.0 | | |

EXAMPLE 3

Following the procedure of Example 1, two series of runs were made with different amounts of total $KHCO_3$ and $K_2CO_3$, one series at a weight ratio of $KHCO_3$-$K_2CO_3$ of 1.5:1 and one at 3.0:1. The results are reported in Table III.

TABLE III

| | Initial Polymerization Rate (%/hr) | |
|---|---|---|
| Total $KHCO_3$ and $K_2CO_3$ (% by wt on 2-pyrrolidone) | $KHCO_3$:$K_2CO_3$ of 1.5:1 | $KHCO_3$:$K_2CO_3$ of 3:1 |
| 1 | 1.0 | 0.75 |
| 1.5 | 1.5 | 1.75 |
| 2.0 | 1.7 | 2.3 |
| 2.5 | 1.4 | 2.4 |
| 3.0 | 1.1 | 2.0 |

The maximum polymerization rate occurred at 1.9 percent total $KHCO_3$ and $K_2CO_3$ at a weight ratio thereof of 1.5:1 and occurred at 2.3 percent at a weight ratio of 3.1.

EXAMPLE 4

Following the procedure of Example 1, Darco Activated carbon black (Grade G60) having a median particle size of 16 microns was used as the particulate material, and the results are reported in Table IV below. Also tested as the particulate material was a portion of a polymerizate that was prepared in the manner of Example 1 using 264 grams 2-Pyrrolidone, 20.4 grams KOH pellets (85 percent assay), 4.3 grams $KHCO_3$ (reagent grade) and 1.2 grams $K_2CO_3$ (reagent grade) and allowed to polymerize for 2.5 hours (about 3 percent conversion). Table IV also shows the results of these tests.

TABLE IV

| Run | Particulate Material | Amount of Particulate Material (wt.% on 2-Pyrrolidone) | Initial Polymerization Rate (%/hr) |
|---|---|---|---|
| 1 | None | None | 0.3 |
| 2 | Carbon Black | 1 | 1.6 |
| 3 | Polymerizate | 0.84 | 2.3 |
| 4 | Polymerizate | 0.57 | 1.4 |

The importance of Run 2 is that it shows that such widely divergent material as bicarbonates and carbon black can be used. The importance of Runs 3 and 4 is that a polymerizate as prepared in Example 1 can be used as a source of the particulate material.

The $KHCO_3$, $K_2CO_3$ and carbon black used in the Examples had a particle size distribution as follows:

| Particle Size (microns) | $KHCO_3$ (weight %) | $K_2CO_3$ (weight %) |
|---|---|---|
| +1680 | 0 | 0 |
| 1190 × 1680 | 0.4 | 0 |
| 840 × 1190 | 0.5 | 3.6 |
| 420 × 840 | 27.4 | 59.1 |
| 250 × 420 | 49.7 | 33.2 |
| 177 × 250 | 18.7 | 3.6 |
| −177 | 3.3 | 0.05 |

| Particle Size (microns) | Carbon Black (weight %) |
|---|---|
| +75 | 23.4 |
| 60 × 75 | 0.5 |
| 45 × 60 | 0.6 |
| 36 × 45 | 11.4 |
| 20 × 30 | 3.5 |
| 10 × 20 | 32.0 |
| −10 | 28.6 |

What is claimed is:

1. A process for the polymerization of 2-pyrrolidone to form a solid polymer, which comprises admixing 2-pyrrolidone with an alkaline polymerization catalyst, carbon dioxide as a polymerization activator, and a particulate material, the particulate material being added to the admixture from a source external of the admixture, the particulate material being a mixture of an alkaline metal bicarbonate and an alkaline metal carbonate in a weight ratio of bicarbonate to carbonate of from about 1.6:1 to about 6:1, the total weight of said mixture of bicarbonate and carbonate being from about 1.2 percent to about 3.5 percent, by weight, based on the weight of the 2-pyrrolidone.

2. The process according to claim 1, wherein the particulate material has a particle size of from about 0.005 mm to about 2 mm.

3. The process according to claim 1, wherein said 2-pyrrolidone is admixed with the alkaline polymerization catalyst and the particulate material, and the $CO_2$ is then bubbled through the resulting admixture.

4. A process for the polymerization of 2-pyrrolidone to form a solid polymer, which comprises admixing 2-pyrrolidone with an alkaline polymerization catalyst, carbon dioxide as a polymerization activator, and a particulate material, the particulate material being added to the admixture from a source external of the admixture, the particulate material being a partially polymerized reaction mass prepared by polymerizing 2-pyrrolidone in the presence of an alkaline polymerization catalyst and carbon dioxide as a polymerization activator, the amount of said partially polymerized reaction mass being from about 0.3 to about 10 percent by weight, based on the weight of the 2-pyrrolidone.

5. The process according to claim 4, wherein said 2-pyrrolidone is admixed with the alkaline polymerization catalyst and the particulate material, and the $CO_2$ is then bubbled through the resulting admixture.

* * * * *